United States Patent [19]

Löhr et al.

[11] 4,137,337
[45] Jan. 30, 1979

[54] METHOD AND APPARATUS FOR ADDING SALT OR SEASONINGS TO FOOD BEING COOKED IN STEAM COOKERS

[75] Inventors: Alfred Löhr, Bochum; Wolfgang Tschek, Gelsenkirchen, both of Germany

[73] Assignee: Kuppersbusch Aktiengesellschaft, Gelsenkirchen, Germany

[21] Appl. No.: 709,292

[22] Filed: Jul. 28, 1976

Related U.S. Application Data

[63] Continuation-in-part of Ser. No. 556,174, Mar. 6, 1975, abandoned.

[30] Foreign Application Priority Data

Mar. 6, 1974 [DE] Fed. Rep. of Germany ....... 2410552

[51] Int. Cl.² ............................................. A23L 1/216
[52] U.S. Cl. ..................................... 426/637; 426/442; 426/510
[58] Field of Search ............... 426/442, 523, 302, 304, 426/323, 326, 533, 534, 637, 649, 650, 510, 806; 118/326

[56] References Cited

U.S. PATENT DOCUMENTS

| 213,029 | 3/1879 | Ashcroft | 426/523 |
| 2,490,431 | 12/1949 | Greene et al. | 426/637 |
| 3,594,187 | 7/1971 | Liepa | 426/637 |
| 3,689,282 | 9/1972 | Feinberg | 426/234 |
| 3,806,612 | 4/1974 | Satz et al. | 426/302 |
| 3,879,566 | 4/1975 | Cox et al. | 426/323 |

*Primary Examiner*—Raymond N. Jones
*Assistant Examiner*—Elizabeth A. Hatcher
*Attorney, Agent, or Firm*—Spencer & Kaye

[57] ABSTRACT

A method is provided for adding salt or seasonings to food being cooked in steam cookers. A heated salt solution or heated seasoning solution which is appropriate for the food to be cooked is brought into contact with the food before, during or after the steaming process. The solution is brought into contact with the food once or several times.

Apparatus is provided for adding salt or seasonings to food being cooked in a steam cooker cooking vessel having a cooking chamber. The apparatus includes a separate collecting vessel for accommodating a salt or seasoning solution, a supply line attached to the collecting vessel for connecting the collecting vessel to the cooking vessel, and a conveying and turnover pump for conveying the salt or seasoning solution from the collecting vessel to the food in the cooking chamber through the supply line.

9 Claims, 7 Drawing Figures

METHOD AND APPARATUS FOR ADDING SALT OR SEASONINGS TO FOOD BEING COOKED IN STEAM COOKERS

CROSS-REFERENCE TO RELATED APPLICATION

This application is a continuation-in-part of our earlier filed, copending application, Ser. No. 556,174, filed on Mar. 6, 1975, abandoned.

FIELD OF THE INVENTION

The present invention relates to a method and apparatus for adding salt or seasonings to food being cooked in steam-operated cookers.

BACKGROUND OF THE INVENTION

In order to obtain good taste quality in food being cooked, it is necessary to season such food with accurately measured quantitites of salt or other seasonings. In the prior art, the adding of additional salt to foods being cooked in steam-operated cookers, for one reason or another, was impossible or only incompletely possible. For example, in stewed potatoes, the natural salt contained in the potato is insufficient to produce good taste quality so that the potatoes must receive additional crystalline salt before the steaming process by mixing or enrichment. It is also known to let the potatoes stand some time in a cold saline solution before the steaming process. However, this latter process does not produce the same taste quality as potatoes cooked in salt water.

SUMMARY OF THE INVENTION

It is an object of the present invention to provide a method which assures, in a simple manner, a very uniform and quick addition of sufficient quantities of salt or seasoning to food being cooked.

It is a further object of the invention to provide apparatus for practicing the method of adding salt or seasonings. Another object of the invention is to provide such apparatus which is simple in structure, maintenance and operation so that it can also be operated without errors by unskilled labor.

Additional objects and advantages of the present invention will be set forth in part in the description which follows and in part will be obvious from the description or can be learned by practice of the invention. The objects and advantages are achieved by means of the methods, instrumentalities and combinations particularly pointed out in the appended claims.

To achieve the foregoing objects, and in accordance with its purpose, the present invention provides a process for adding salt or seasonings to food being cooked in steam cookers which comprises bringing a heated salt solution or other heated seasoning solution which is appropriate for the particular food to be cooked and which is heated to a temperature of from about 60° C to 90° C, into contact with the food, once or several times, before, during or after the steaming process.

With this process, it is possible, particularly in steam-operated pressure cookers, to sufficiently enrich the food being cooked in the shortest time with the necessary amounts of salt or seasonings required to develop the proper taste quality.

In another aspect of the invention, apparatus are provided for practicing the method. In one embodiment of an apparatus for adding salt or seasoning to food being cooked in a steam cooker having a cooking chamber, there is provided a collecting vessel for accommodating a salt or seasoning solution, a supply line on the vessel for connection to the cooker, and a conveying and turnover pump for conveying the solution from the collecting vessel to the food in the cooking chamber through the supply line.

This apparatus makes it possible to add salt or seasonings to food completely automatically. The apparatus can be provided with heating, timing and temperature control devices.

In another embodiment of an apparatus for adding a salt or seasoning solution to food, there is provided a collecting vessel for accommodating a salt solution or seasoning solution, a spray chamber above the collecting vessel where food containers containing the food can be placed for the purpose of spraying the food with the solution, a supply line connected to the collecting vessel for supplying solution to the spray chamber, and a conveying and turnover pump for conveying the solution from the collecting vessel to the food in the spray chamber through the supply line.

In still another embodiment of an apparatus for adding a salt or seasoning solution to food, there is provided a collecting vessel for accommodating a salt or seasoning solution and a lifting device for lowering and raising food containers containing the food into and out of the collecting vessel.

It is to be understood that both the foregoing general description and the following detailed description are exemplary and explanatory but are not restrictive of the invention.

DESCRIPTION OF THE DRAWINGS

The accompanying drawings, where the same reference numbers indicate like parts, illustrate examples of the presently preferred embodiments of the invention and together with the description serve to explain the principles of the invention.

DETAILED DESCRIPTION OF THE INVENTION

In the practice of the present invention, the heated salt or seasoning solution that is brought into contact with the food generally has a temperature of between about 60° C to 90° C, such as, for example, 60° to 80° C or 80° to 90° C. The concentration of the salt or seasoning in the salt or seasoning solution generally is between 5% and 20% by weight, depending on the type of food being cooked, and can be, for example, between 10 and 15% by weight of the solution. The food is treated with the heated salt or seasoning solution for between 15 to 60 seconds at a time, such as 30 to 60 seconds at a time. The salt in the salt solution can be common table salt, NaCl. The method of the present invention for salting or seasoning food is used in large-scale kitchens in which the food is cooked in a tightly sealed cooking chamber by the addition of hot steam. In one embodiment of the invention, in the cooking chamber the food is brought into contact not only with the hot steam to cook it but also with the heated salt or seasoning solution.

Figure 1A:
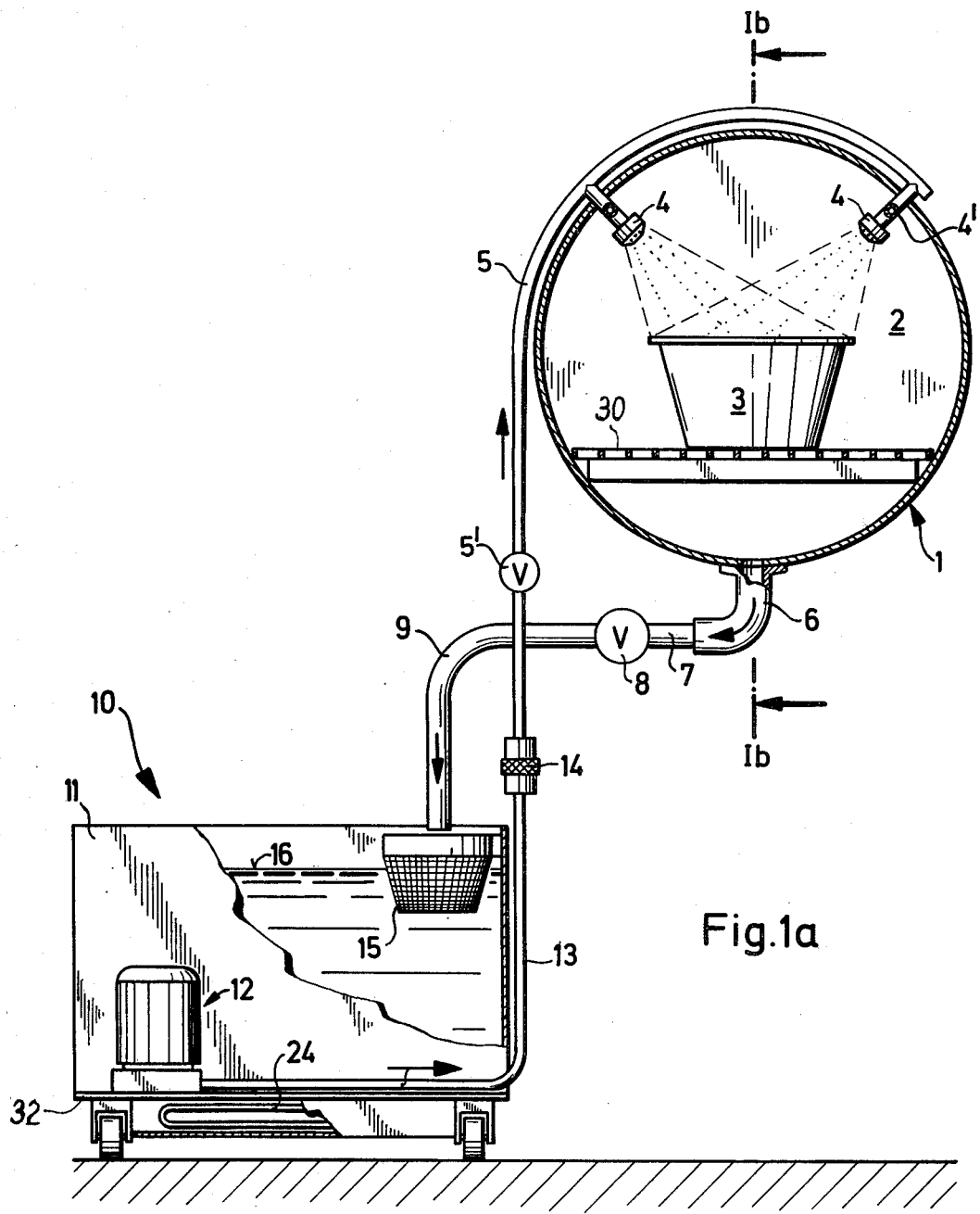
FIG. 1a is a schematic view of an apparatus constructed in accordance with the teachings of the present invention.
Figure 1B:
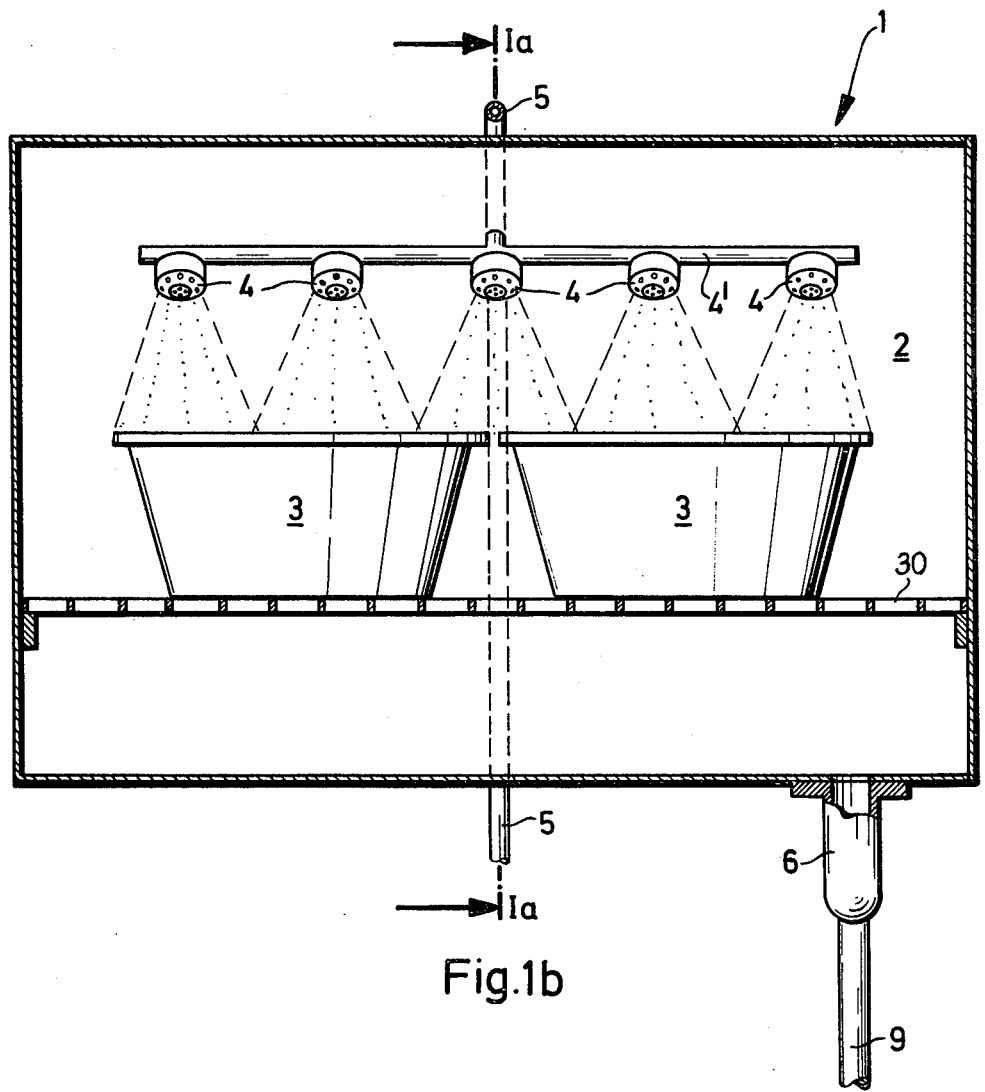
FIG. 1b is a vertical sectional view taken along lines Ib—Ib of FIG. 1a and showing the cooker in greater detail.

Referring to FIGS. 1 and 2, there is shown a cooker generally 1, which serves to cook food by means of steam. Cooker 1 includes substantially a lockable cooking chamber 2 for accommodating the food to be cooked. The food to be cooked is introduced into cooking chamber 2 by means of one or more food containers 3. In the upper region of cooking chamber 2, a plurality of spray nozzles 4 are provided at opposite sides of the cooking chamber. A first set of spray nozzles 4 is on one side of cooking chamber 2 and a second set of spray nozzles 4 is on the other side. These nozzles 4 are connected to a pipe network 4', as best shown in FIG. 1b, and are in communication through pipe network 4' with a feeder line 5 which extends outside of cooking chamber 2. A locking valve 5', shown in FIG. 1a, is provided in feeder line 5 outside cooking chamber 2. Spray nozzles 4 are arranged so that their spray is directed approximately into the center of cooking chamber 2 where the food container(s) 3 are disposed on a support platform 30. At the bottom of cooking chamber 2, there is a discharge pipe 6 with an outlet line 7 connected thereto. A locking valve 8 is provided in outlet line 7. Behind locking valve 8, outlet line 7 continues as an elbow pipe 9.

An apparatus 10 from which a salt or seasoning solution can be automatically added to the food in cooking chamber 2 is disposed adjacent cooking chamber 2. Apparatus 10 includes a frame 32 on which a collecting vessel 11 is mounted for accommodating a salt or seasoning solution 16. In the illustrated embodiments of FIGS. 1a and 1b, apparatus 10 is preferably designed to be movable by having frame 32 supported on wheels.

Apparatus 10 is provided with a conveying and turnover pump 12 mounted on frame 32 and a supply line 13 connected to pump 12. Conveying and turnover pump 12 pumps the salt or seasoning solution in collecting vessel 11 through supply line 13 coupled to feeder line 5 which is coupled to supply line 13 and then to spray nozzles 4 in cooking chamber 2. A quick-locking coupling 14 couples supply line 13 to feeder line 5. Collecting vessel 11 is provided with a heating device 24 for heating the salt or seasoning solution. Heating device 24, in the embodiments of FIGS. 1a and 1b, preferably is attached to the outer underside of collecting vessel 11. Collecting vessel 11 includes a removable strainer 15 into which opens elbow pipe 9 of outlet line 7 from cooking chamber 2.

With this apparatus 10, it is now possible to bring a heated salt or seasoning solution, which has been adapted to the respective food being cooked and appropriately concentrated, into contact with the food once or even several times before, during or after the steaming process. This is done by conveying the heated salt or seasoning solution by means of conveying and turnover pump 12 through the supply line 13 and feeder line 5 coupled thereto to nozzles 4 in cooking chamber 2. The food is then uniformly sprayed from the top with the conveyed salt or seasoning solution by means of nozzles 4. The spraying range of nozzles 4 entends over the entire surface area of the food being cooked in cooker 1. The excess salt or seasoning solution dripping off the food is collected in the lower trough-type portion of cooking chamber 2 and is returned through outlet line 7, elbow pipe 9 and strainer 15 to the collecting vessel 11 from where the solution can re-enter the above-described circulation.

Figure 2A:
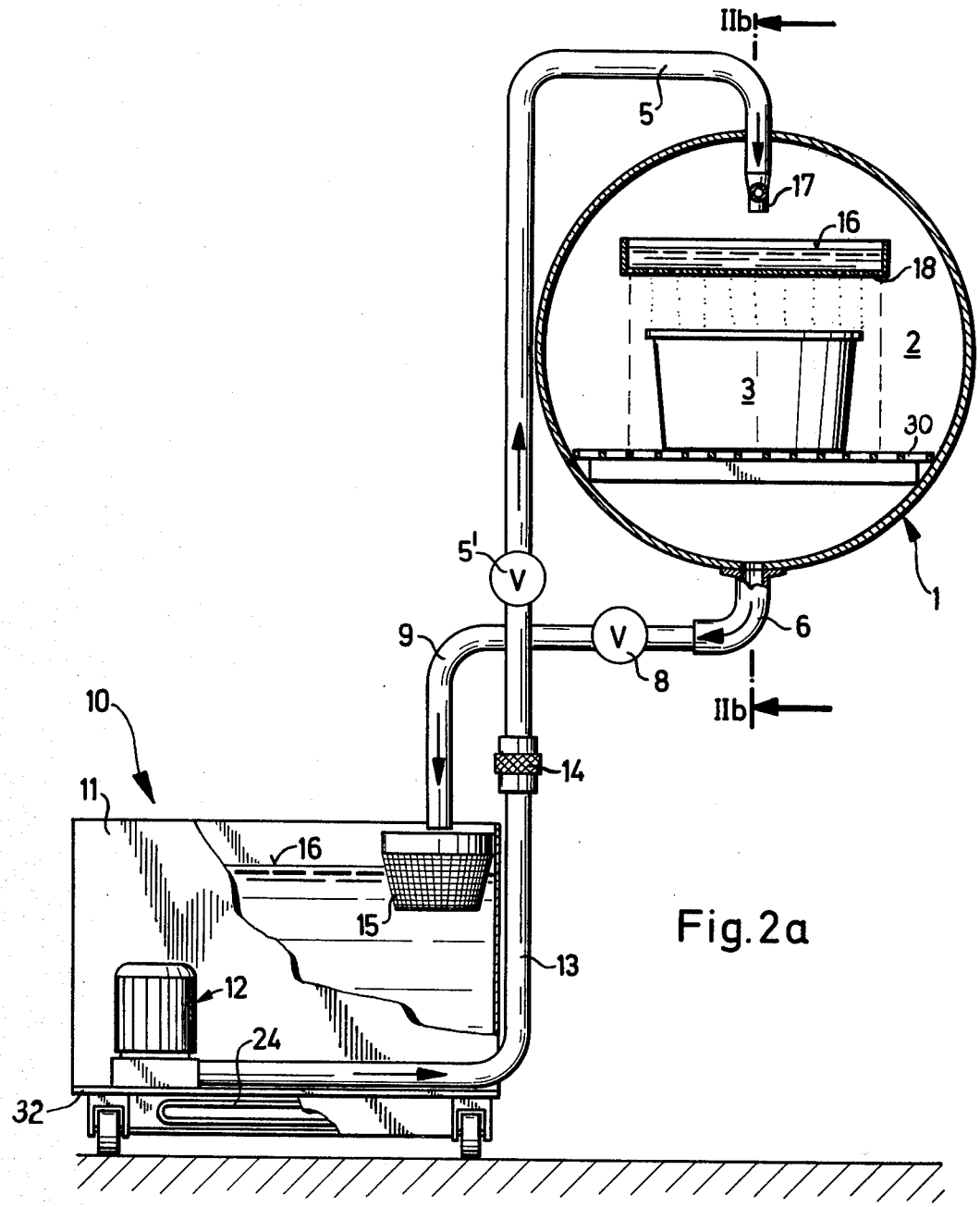
FIG. 2a is a schematic view of another embodiment of an apparatus constructed in accordance with the teachings of the present invention.
Figure 2B:
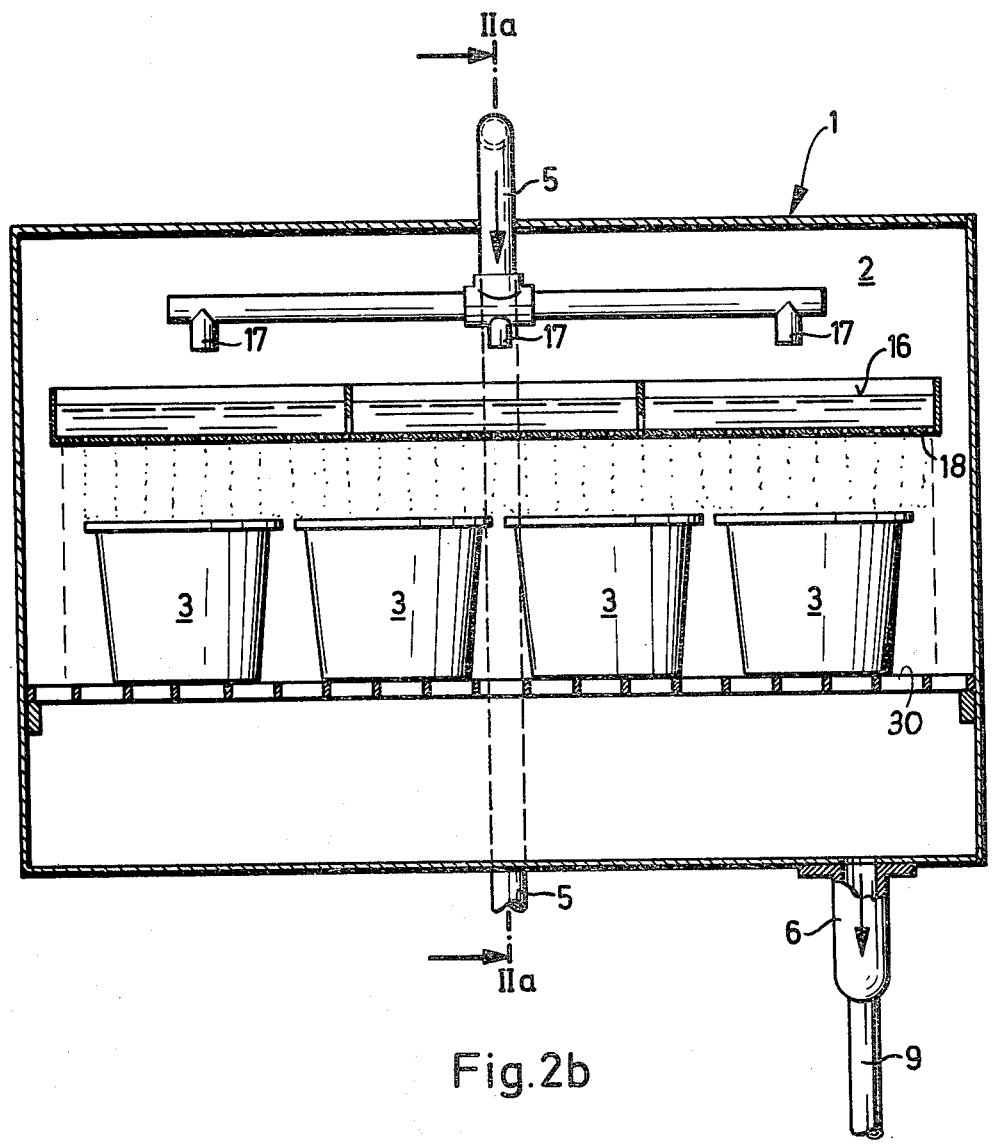
FIG. 2b is a vertical sectional view taken along lines IIb—IIb of FIG. 2a and shows the cooking chamber in greater detail.

Turning now to the embodiments of the invention shown in FIGS. 2a and 2b, there is shown a plurality of large dimension, free outlets 17 which are provided in cooking chamber 2 instead of the spray nozzles 4 employed in the embodiments of FIGS. 1a and 1b. These outlets 17 are in communication with feeder line 5 and dispense the salt or seasoning solution 16 provided from collecting vessel 11 to a trough-shaped perforated metal sheet 18 which is provided in cooking chamber 2 between the food container(s) 3 and outlets 17. Perforated metal sheet 18 extends over the entire surface of the food so that the salt or seasoning solution 16 is uniformly distributed over the food to be seasoned through a large number of openings.

The arrangement of a perforated sheet 18 instead of spray nozzles 4 has the advantage that the food will not be charged with too high a pressure from spray jets which could result in damage and breaking-up of the food.

Figure 3:
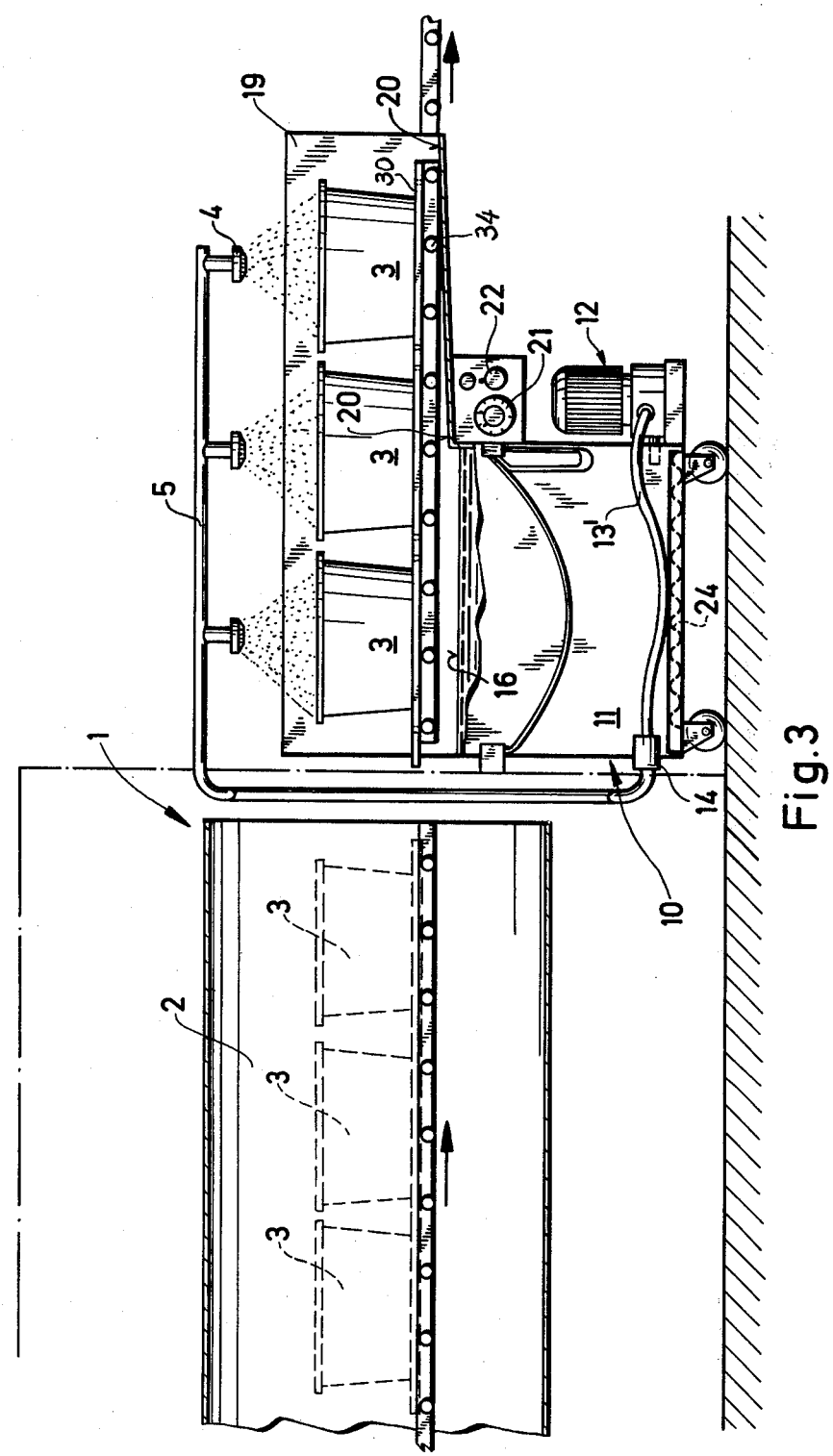
FIG. 3 shows another embodiment of an apparatus of the present invention employing a spray chamber outside of the cooking vessel.

In another embodiment of the invention, and as shown in FIG. 3, a movable apparatus 10 mounted on wheels is provided with spray chamber 19 outside of cooker 1 and above collecting vessel 11. Food containers 3 containing the food are introduced into spray chamber 19 for the purposes of being sprayed with the salt or seasoning solution 16. Spray chamber 19 is provided at its bottom with a sloped drain 20 over which excess salt or seasoning solution 16 can return into collecting vessel 11. Apparatus 10 is provided with a timer 21 as well as an adjustable control device 22 for controlling the temperature of the salt or seasoning solution 16. The food cooked in cooking chamber 2 can be transported intermittently or continuously through spray chamber 19. As seen in FIG. 3, spray chamber 19 contains a series of rollers 34 on which support platform 30 is mounted. Rollers 34 are at the same height as a series of rollers in cooking chamber 2 so that support platform 30 and food containers 3 can easily be transferred between spray chamber 19 and cooking chamber 2. The supply line coming from conveying pump 12 and connected to feeder line 5 is here provided in the form of a hose 13'.

Figure 4:
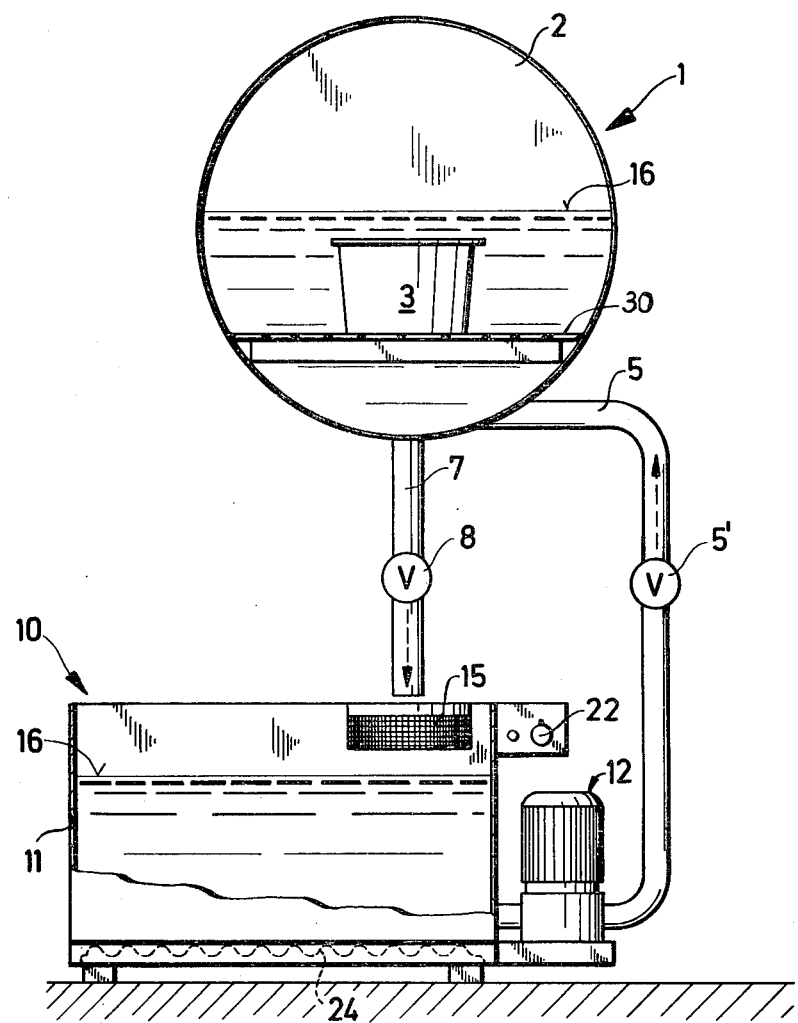
FIG. 4 shows another embodiment of an apparatus of the present invention wherein the food is completely immersed in the solution in the cooking chamber.

In another embodiment of an apparatus according to the present invention, there is shown in FIG. 4, an apparatus 10 which is stationary and not mounted on wheels. In contrast to the embodiments described above, in the embodiment of FIG. 4, the food containers 3 are completely surrounded by the salt or seasoning solution in cooking chamber 2. The solution is discharged from cooking chamber 2 either through feeder line 5 or through a separate outlet line 7. In this embodiment of the invention, feeder line 5 is attached directly to conveying pump 12 and serves as the supply line coming from the conveying pump 12. Feeder line 5 empties directly into the bottom of cooking chamber 2 to fill the bottom of the cooking chamber with solution.

Figure 5:
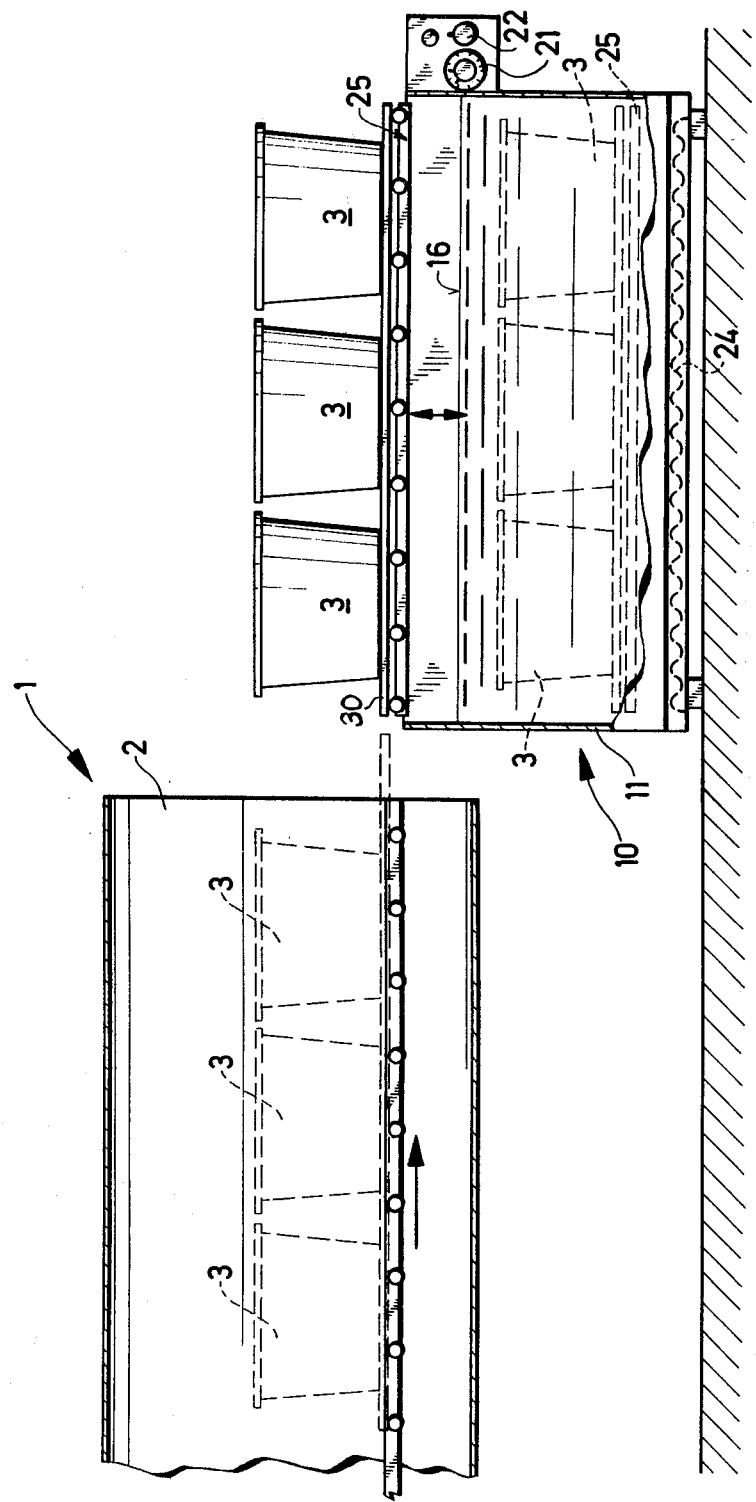
FIG. 5 shows another embodiment of an apparatus of the present invention wherein the food is immersed in the solution in the collecting vessel.

In another embodiment of an apparatus according to the present invention, as shown in the embodiment of FIG. 5, the apparatus 10 may also be stationary. Food containers 3 supported on support platform 30 which is mounted on rollers are moved from cooking chamber 2 onto apparatus 10 which contains rollers for receiving the support platform 30. The food containers 3 coming from cooking chamber 2 are then dipped into a hot salt or hot seasoning solution contained in collecting vessel 11, where they are completely immersed, by means of a lifting device, generally 25, either intermittently or continuously, for a certain period of time. Lifting device 25 may also be used if apparatus 10 is movable. Lifting device 25 can comprise any conventional drive mechanism for lowering and raising a support platform 30.

One embodiment of the process of the present invention will now be explained in detail for the apparatus shown in FIG. 1a.

Depending on the consistency of the food to be cooked a salt solution of about 1 to 3 liters per kilogram of food is considered to be sufficient. The salt content of the solution should lie between 5 and 20% depending on the type of food being cooked. The temperature for the salt or seasoning solution advantageously lies between about 60° C to 80° C. It is assumed that in the cooker of FIG. 1a potatoes are to be cooked. The container 3 for the food is here a known standard container having a volume, for example, of 17.5 liters. Upon completion of the cooking process, the now cooked potatoes are sprayed for about 15 to 60 seconds in the food container 3 with the salt solution which has been heated in collecting vessel 11, about 1.5 liter salt solution per kilogram of potatoes being pumped from collecting vessel 11 to spray nozzles 4 in the cooking chamber 2. Once the salt solution which has been sprayed over the potatoes has run out of container 3, the container(s) are removed from cooking chamber 2 and are transported to a warming arrangement or for dispensing.

A second embodiment of the process of the present invention will now be explained in connection with the apparatus of FIG. 4.

In the cooker of FIG. 4, upon completion of the cooking process, a hot salt solution is pumped out of collecting vessel 11 into cooking chamber 2 of the cooker. Enough salt solution must be pumped into cooking chamber 2 so that the food containers 3 are completely immersed in the salt solution. The heated solution is circulated during immersion of the food in the heated solution. Since in this process the salt is better and more rapidly absorbed by the food than with mere spraying, the lower limit of the given concentration range of the salt solution is sufficient in this case. After a short period of immersion of the food in the salt solution, which here lies at about 20 seconds, the salt solution is pumped out of cooking chamber 2 and returned to collecting vessel 11 where the salt solution is held ready for further use or is replenished by the addition of salt and/or water to its original or some other concentration.

It will be understood that the above description of the present invention is susceptible to various modifications, changes and adaptations, and the same are intended to be comprehended within the meaning and range of equivalents of the appended claims.

What is claimed is:

1. A method for cooking food in a steam cooker having a cooking chamber, said method comprising the steps of placing the food to be cooked in at least one container, inserting said container, having food therein, in said cooker and bringing a heated NaCl salt solution or other heated seasoning solution which is heated to a temperature of from about 60° C to 90° C into contact with the food before, during or after the steaming process, with the concentration of salt or seasoning in the heated solution being between about 5 and 20% by weight, and the length of contact of the food with the salt or seasoning solution being between 15 and 60 seconds.

2. Method as defined in claim 1 wherein the food is sprayed with the salt or seasoning solution.

3. Method as defined in claim 1 wherein the food is dipped into the salt or seasoning solution once or several times.

4. Method as defined in claim 3 wherein the heated solution is circulated during the dipping.

5. Method as defined in claim 1 wherein the food is steam cooked in a cooking chamber, and the heated salt or seasoning solution is brought into contact with the cooked food in the cooking chamber upon completion of the cooking.

6. The method as defined in claim 5 wherein the cooked food is immersed in the heated salt or seasoning solution.

7. The method as defined in claim 6 wherein the heated solution is circulated during the immersion of the food.

8. The method as defined in claim 5 wherein the heated solution is sprayed onto the cooked food.

9. The method as defined in claim 1 wherein the food is steam cooked in a cooking chamber and the cooked food is removed from the cooking chamber and then sprayed with the heated solution.

* * * * *